United States Patent Office 3,211,687
Patented Oct. 12, 1965

3,211,687
SOLUTIONS OF VINYLIDENE FLUORIDE
POLYMERS
Nicholas J. Capron, Chalfont, Alfred C. Whiton, Norristown, and Alkis Christofas, Philadelphia, Pa., assignors to Pennsalt Chemicals Corporation, Philadelphia, Pa., a corporation of Pennsylvania
No Drawing. Filed Feb. 5, 1960, Ser. No. 6,866
1 Claim. (Cl. 260—30.8)

This invention is directed to solutions of polymers and copolymers of vinylidene fluoride and to methods of casting films and coatings from the said solutions.

The homopolymer of vinylidene fluoride, generally called polyvinylidene fluoride, exhibits outstanding chemical and physical properties, partially due to its high fluorine content. Free radical polymerization of the vinylidene fluoride monomer produces a polymer averaging more than 2000 monomer units per chain. The highly regular structure of the resultant polymer permits close packing of the polymer chain. Moreover, hydrogen bonding between chains is maximized since hydrogen and fluorine atoms are balanced producing cross bonding of high energy. The crystalline and disordered regions combine to form hyper-structures which impart strength, rigidity and resilience to the polymer.

This highly crystalline polymer can be oriented or stretched to produce an alignment of crystallites, thereby developing super tensile-strength properties desirable for film and filament uses. The polymer has excellent chemical resistance to acids and bases and is insoluble in nearly all solvents at ambient temperatures. Since the vinylidene fluoride polymer is a thermoplastic material, it can be injection molded or extruded into articles having a desired shape.

The vinylidene fluoride homopolymer may be prepared by polymerization methods well known in the art such as are taught in United States Patent No. 2,435,537, granted February 3, 1948. The copolymers containing at least 95 mol percent of vinylidene fluoride which are also the subject matter of our invention may be prepared in the same manner.

The vinylidene fluoride polymer may be used in the formation of plastic coats, sheets, envelopes and coverings in the nature of protective materials and for films and coatings for adherence to mechanical equipment such as fans, blowers, tanks, agitators, etc., where a high degree of resistance to chemical attack or to solvents is desired. In most of these applications it is unsatisfactory to cast the films or form the coats from a melt because of the difficulty of handling molten vinylidene fluoride polymer at a temperature of about 200° C. where melt viscosities are 300,000 to 1 million poises. In order to overcome the difficulties inherent in casting film from molten vinylidene fluoride polymer we have sought methods of forming such films and coatings using organic solvents.

Accordingly, we have now discovered that vinylidene fluoride polymers can be solvated with certain organic solvents at elevated temperatures to form pseudo solutions which are stable at ambient temperatures. Moreover, fairly thick films and coatings can be obtained with one application. Thus, we have been able to obtain films and coatings which are 1 to 3 thousandths of an inch thick in one operation. Because of the crystalline nature of the vinylidene fluoride polymer we have discovered only a few organic liquids which are satisfactory solvents useful for coating purposes.

While our discoveries are directed primarily to the vinylidene fluoride homopolymer, they are also directed to vinylidene fluoride copolymers containing a small percentage of a halogen-containing ethylene, the vinylidene fluoride being present in amounts not less than 95 mol percent. At this concentration the important solution properties of copolymers of vinylidene fluoride are nearly identical to the homopolymer. Satisfactory haloethylenes which can be copolymerized with the vinylidene fluoride are vinyl chloride, vinyl fluoride, vinyl bromide, vinylidene chloride, difluorochloroethylene, trifluorochloroethylene and tetrafluoroethylene. Whenever the term vinylidene fluoride polymer or copolymer is used in this application, we are referring to the homopolymer or copolymers as defined above.

We have found that the ability of an organic liquid to lower the crystalline melting point, $T_m$, of vinylidene fluoride polymers is a semi-quantitative measure of its solvating effect upon that polymer. By $T_m$ is means the polymer concept of first order transition point which we have found to be 175–180° C. for polyvinylidene fluoride. The solvent lowering of $T_m$ for vinylidene fluoride polymer can be measured by viewing a polymer film specimen in the presence of said solvent between crossed polaroid sheets as the temperature is raised. Birefringence of the polymer shows light transmission in a dark field which disappears when solvation of the polymer is sufficient to destroy the polymer crystallites. Thusly, various organic liquids impart specific $T_m$ values for vinylidene fluoride polymers depending upon their ability to solvate the polymer. Conversely, little or no solvent action occurs upon vinylidene fluoride polymers below the observed $T_m$ values for a given solvent.

Those organic compounds which lower the $T_m$ of the vinylidene fluoride polymer below 90° C. are classified as pseudo-solvents for the polymer and are useful for preparing pseudo or apparent solutions of the polymer at ambient temperatures. However, the organic materials which impart a $T_m$ to the polymer within the range of 90 to 160° C. are designated as high temperature organic solvents, that is, they have no effect on the polymer below about 90° C. This is evidenced by microscopic examination of these suspensions after six months storage and by the further fact that little or no change in viscosity was apparent.

We have used the term pseudo-solutions in describing the combination of solvent and vinylidene fluoride polymer at room temperature. This term has resulted from our discovery that while the vinylidene fluoride polymer will appear to be in solution at an elevated temperature, that is, in excess of room temperature, upon cooling to room temperature these materials are not true solutions but are in a highly solvated fluid state. This is readily demonstrated by observing light scattering or Tyndall effects with these solutions. However, these pseudo-solutions are readily processed by normal solution techniques. The organic materials which exert this unusual action on the polyvinylidene fluoride polymers impart a $T_m$ or solvent melting point for the polymers in the range of about 50 to about 90° C. and have a boiling point within the range of about 160 to about 210° C.

We have also discovered a preferred group of solvents which produce pseudo-solutions of polyvinylidene fluoride at ambient temperature and which impart a $T_m$ to the polymer within the range of about 50 to about 90° C. These preferred solvents produce vinylidene fluoride polymer products which are free of blush, an opacity in the plastic due to moisture pick-up from the atmosphere. For some purposes blush does not interfere with use of the plastic. However, for electrical uses where low conductivity and dielectric properties are required, a variable moisture content would make the material undesirable. Blushing is also objectionable where a clear film is desired as for wrapping and packaging materials.

The $T_m$ temperatures and boiling points for our preferred solvents of this type are as follows:

SOLVENT MELTING TEMPERATURE ° C.

|  | $T_m$ | Boiling Point @ 760 mm. |
|---|---|---|
| Dimethylacetamide | 52 | 165 |
| Tetramethylurea | 65 | 177 |
| Diethylacetamide | 78 | 205 |
| Dimethylsulfoxide | 80 | 177 |

While it is normal to use just one solvent for preparing solutions of the vinylidene fluoride polymers, it will be apparent to those skilled in that art that a combination of these solvents may be used. The disadvantage in using multiple solvent solutions is that the difficulties in recovering and reusing the solvents are increased.

Other materials which exhibit a solvating action on the vinylidene fluoride polymers but which impart a crystalline melting point temperature above the useful range of about 50 to about 90° C. and/or whose boiling points are above the 160 to 210° C. range will no longer produce pseudo solutions but only gel at ambient temperatures.

The above $T_m$ temperatures were determined with vinylidene fluoride homopolymers. There is no appreciable change in the crystalline melting temperatures which these solvents impart to copolymers containing a small amount of a halogenated ethylene provided at least 95 mol percent vinylidene fluoride is present in the copolymer. $T_m$ temperatures for the copolymers of this invention with respect to the preferred active solvents listed above are as follows:

|  | Homopolymer, $T_m$—° C. | Copolymer A $T_m$—° C. | Copolymer B $T_m$—° C. |
|---|---|---|---|
| Dimethylacetamide | 52 | 28 | 65 |
| Tetramethylurea | 65 | 40 | 80 |
| Diethylacetamide | 78 | 38 | 65 |
| Dimethylsulfoxide | 80 | 82 | 70 |
| Without Solvent | 180 | 175–185 | 165–180 |

A—1,1,2-trifluoro-2-chloroethylene.
B—symmetrical difluorodichloroethylene.

We have found that solvents which impart a $T_m$ in the 50 to 90° C. range to vinylidene fluoride polymers and with boiling points in the 160–210° C. range will dissolve as high as 30% by weight of the combined mixture of vinylidene fluoride polymer. The solvents are particularly useful in the range of 15 to 25% solids. The higher solids content solutions have a high viscosity which limits the manner in which the solutions can be used. About the only successful applications of 30% solids solutions without an added diluent are dipping applications. The viscosities of 15% by weight solutions of vinylidene fluoride copolymer having a particle size of 2 to 5 microns in dimethylacetamide at various temperatures are as follows:

15% DIMETHYLACETAMIDE

Temperature, ° C.:         Viscosity in centipoises
25 ———————————————————— 1800
50 ———————————————————— 1100
75 ———————————————————— 960
100 ——————————————————— 480

The solutions of vinylidene fluoride polymer in the solvents may be prepared in the following manner. The solvent is placed in a container equipped with an agitator and the temperature is raised to about 60° C. or within the range of 50 to 90° C. The vinylidene fluoride polymer in powder form is slowly added to the agitated solvent. Agitation is continued until apparent solution occurs. The mixture is then allowed to cool to room temperature and is then ready for use. Other mixing apparatus may be used such as paint mills and colloid mills. The particle size of the polymer is not of prime importance in preparing these solutions. If the polymer is in powder form, it will go into solution readily and in a short period of time.

In order to avoid a high solution viscosity, we have discovered that we can use another organic liquid which is not a solvent for the vinylidene fluoride polymer which will reduce the viscosity of the solution of the polymers in the solvent. In general, any organic liquid miscible with the solution of vinylidene fluoride polymer in the solvent is suitable. Examples are acetone, dioxane, methylisobutylketone, tetrahydrofuran, methylethylketone, xylene, methylamylketone. Generally, we prefer to use only one diluent but more than one can be used if desired.

The amount of diluent to be added will be determined primarily by the viscosity required by the particular method of application of the solution. This will be a compromise between the desire to have the maximum solids content in the mixture in order to obtain maximum coating or film thickness with a low enough viscosity to have solutions which will flow. In general, the amount of diluent may vary from 5 to 50% of the total mixture weight.

In preparing these solutions of vinylidene fluoride polymers in the solvents followed by dilution in another organic solvent, we have discovered that there is a synergistic effect on the solution viscosity brought about by the combined solvents. For example, when 15 parts by weight of vinylidene fluoride polymer is added to 85 parts by weight of dimethyl acetamide, the solution has a viscosity of 1300 centipoises at 25° C. This was polymer material having a particle size of 2 to 5 microns. When the same 15 parts by weight of polyvinylidene fluoride of the same particle size was added to only 45 parts by weight of dimethyl acetamide together with 40 parts by weight of acetone, the viscosity at 25° had dropped to 580 centipoises.

This was quite unexpected for fluorinated materials because the percent solids in the respective solutions were the same and since acetone exhibits little solvating action by itself on the vinylidene fluoride polymer. The synergistic effect of the added diluents on the viscosity of the vinylidene fluoride polymer in solvents can be observed in the following tables. The same vinylidene fluoride polymer having a particle size of 2 to 5 microns was used in all of the measurements. The viscosity was measured with a Brookfield viscosimeter.

SYNERGISM OF DILUTED SOLUTIONS—VISCOSITY CHANGE WITH TEMPERATURE AND PERCENT SOLIDS

[Solvent—dimethylacetamide]

| 15% Vinylidene Fluoride Homopolymer | | 20% Vinylidene Fluoride Homopolymer | |
|---|---|---|---|
| Temp., ° C. | Centipoises | Temp., ° C. | Centipoises |
| 25 | 1,300 | 25 | 5,300 |
| 50 | 900 | 50 | 2,300 |
| 75 | 600 | 75 | 1,450 |

EFFECT OF DILUENTS

[15 parts vinylidene fluoride in solution with 45 parts of dimethylacetamide thereafter]

| Diluted by— | | | | | |
|---|---|---|---|---|---|
| 40 Parts Acetone | | 40 Parts Tetrahydrofuran | | 40 Parts Methylisobutylketone | |
| Temp., ° C. | Centipoises | Temp., ° C. | Centipoises | Temp., C. | Centipoises |
| 25 | 580 | 25 | 800 | 25 | 800 |
| 50 | 300 | 50 | 400 | 50 | 500 |

Where one diluent is disclosed in this application for reducing viscosity, it will be apparent to those skilled in the art that one or more diluents can be used with equal facility.

In casting film sheets from solutions of the vinylidene fluoride polymer, a quantity of the solution is placed on a smooth surface such as glass, polished steel, or other metal, and the solution is drawn with a doctor knife, usually as the smooth surface moves underneath the knife, as on a revolving drum or continuous steel band. After the solution has been drawn down, the coated surface proceeds into a heated chamber wherein it is subjected to elevated temperatures to evaporate the solvent.

The temperature at which the film forms will depend upon the particular solvent used. It is important in evaporating the solvents from the films that the boiling point of the solvent is not exceeded at least during the heating period in which 90% of the solvent is being removed. Thereafter, temperatures higher than the boiling point of the solvent may be used. Generally, drying at 150° C. for 10 minutes followed by 3 to 5 minutes at 180° C. is satisfactory for many operations. Temperatures in excess of 300° C. will discolor the films, and this temperature is not exceeded. If the boiling point of the solvent is exceeded before 90% of the solvent has been removed, there will be boiling of the solvent in the film, the smooth surface of the film will be disrupted, and the film rendered useless. After 90% of the solvent has been removed, the film can be heated up to temperatures at which the polymer itself will be affected such as by softening or melting. Generally, a temperature up to 180 to 200° C. is satisfactory for completion of the drying after 90% of the solvent has been removed. However, higher temperatures up to 300° C. can be used for very short periods of time, up to 3 minutes.

It will be appreciated by those skilled in the art that the rate of solvent removal from the film will be dependent upon the temperature at which the solvent removal operation is taking place. For example, temperatures of 180° C. will remove 90% of dimethyl acetamide solvent from a 15% polymer solution in about 3 minutes, in 5 minutes at 150° C., and in about 10 minutes at 125° C., respectively. For dimethyl sulfoxide, 90% of the solvent will be removed at 180° C. in about 10 minutes while at 150° C. there will be required about 15 minutes for the 90% evaporation of the solvent.

Where it is desired to apply coats by dipping, particularly for irregularly-shaped articles, the article is immersed in the solution and then suspended until excess coating solution has drained off. The article is then placed in a drying chamber and the drying procedure described heretofore is followed. Coatings by dipping applications are primarily used on small objects where it is desired to cover the external surface such as clamps and electroplating racks.

Films prepared from the vinylidene fluoride have shown excellent resistance against outdoor weathering. Another particularly useful application of our polymer in film form is to laminate paper, cloth and wood for corrosion resistance, low water vapor transmission, and good solvent resistance.

Our discoveries will be better understood by a consideration of the following examples.

*Example 1*

Fifteen parts by weight of vinylidene fluoride polymer was mixed with 85 parts by weight of dimethylacetamide. The mixture was heated while agitated for about 10 minutes at 60° C. until clear. Part of this solution was then placed on a chrome plate and was drawn down by an aluminum doctor knife. The plate with coating was then moved into a drying chamber at a temperature of 150° C. and was held there for 10 minutes. The plate and film were then moved to a second drying chamber where the temperature was raised to 180° C. and held for 5 minutes. This was followed by a water quenching at room temperature after which the film was stripped from the plate.

Observation of the film indicated that it was clear and free of pin holes. The film had a thickness of 1 to 2 mils measured with a micrometer. The tensile strength of the film was 5000 p.s.i. at room temperature as measured by an Instron tensile tester.

*Example 2*

Twenty parts by weight of vinylidene fluoride polymer was mixed with 80 parts by weight of tetramethylurea. The mixture was heated while agitated for about twenty minutes at 60° C. until the polymer mixture was clear. Part of this solution was then placed on a chrome plate and was drawn down by an aluminum doctor knife. The plate with the film coating attached was then moved into the first drying chamber at 150° C. and was held at this temperature for 15 minutes. The plate and film were then moved into a second drying chamber where the temperature was raised to 180° C. and was held at this temperature for 5 minutes. The plate and film were then placed in a water quenching tank held at room temperature after which the film was stripped from the plate.

Observation of the film indicated that it was clear and free of pin holes. No bubbles were apparent. The film had a thickness of 1 to 2 mils as measured by a micrometer. The strength of the film was 4950 p.s.i. at room temperature as measured by an Instron tensile tester.

*Example 3*

Ten parts by weight of vinylidene fluoride polymer was added to 90 parts by weight of dimethylsulfoxide. The mixture was heated and agitated at 60° C. for 15 minutes until the solution was clear. Part of this solution was then placed on a chrome plate and was drawn down with a doctor knife. The plate with attached film was then moved into the first drying chamber and was held at a temperature of 115° C. for 15 minutes. The plate and film were then moved into a second drying chamber where the temperature was raised to 180° C. and this temperature was held for 5 minutes. Finally, the plate and film were quenched in water held at room temperature after which the film was stripped from the plate. The film had a thickness of 2 mils, was clear with no color, and was free of pin holes. The tensile strength of the film was 5100 p.s.i. at room temperature as measured by an Instron tensile tester.

*Example 4*

Fifteen parts by weight of vinylidene fluoride polymer was added to 85 parts by weight of diethylacetamide. The mixture was heated at 60° C. with agitation for 15 minutes until the solution was clear. The solution was then allowed to cool to room temperature and part was placed on a chrome plate and was drawn down with a doctor knife. The plate with attached film was then placed in the first drying chamber and held at a temperature of 160° for 10 minutes and then placed in a second chamber and held at 180° for 5 minutes. The plate and attached film were then placed in a water quenching tank held at room temperature after which the film was stripped from the plate.

The film had a thickness of about 5 mils and was clear and free of pin holes. The tensile strength of the film was 4800 p.s.i. at room temperature as measured by an Instron tensile tester.

*Example 5*

A copolymer of vinylidene fluoride and 1,1,2-trifluoro-2-chloroethylene was prepared in a stainless steel autoclave using the following chemicals: 10,000 parts by weight of distilled and deoxygenated water, 75 parts by weight of ammonium persulfate, 30 parts by weight of sodium metabisulfite, 7.5 parts by weight of ferrous sulfate heptahydrate, 210 parts of chlorotrifluoroethylene, and 5000 parts by weight of vinylidene fluoride. The ammonium persulfate, sodium metabisulfite and ferrous heptahydrate were dissolved in the water in the autoclave. The autoclave was then cooled in liquid nitrogen, evacuated after which the chlorotrifluoroethylene and vinylidene fluoride were added to the autoclave by gaseous transfer. The autoclave was agitated at 30° C. for 18 hours and then opened. The polymer dispersion was filtered, washed with water, washed with methyl alcohol, and then finally dried. The copolymer analyzed 1.57% chlorine, indicating 2.9 mol percent chlorotrifluoroethylene in the copolymer.

Fifteen parts by weight of the copolymer was added to 85 parts by weight of dimethylacetamide, and the mixture was agitated and heated to a temperature of 60° C. at which the solution appeared clear. Part of the solution was then placed on a chromium plate and drawn down with a doctor knife. The plate with copolymer film coating was then moved into a drying chamber at a temperature 150° and was held at this temperature for 15 minutes. The plate and film were then moved into a second drying chamber and were held at 180° C. for 10 minutes. The plate and film were then placed in a water quenching tank held at room temperature after which the film was stripped from the plate. The film was clear and free of pin holes. A test of the film by an Instron tensile tester indicated a film strength of 5176 p.s.i. at room temperature.

*Example 6*

A copolymer of vinylidene fluoride and 1,2-difluoro-1,2-dichloroethylene was prepared by adding 50 parts of potassium persulfate and 150 parts of disodium hydrogen phosphate to 15,000 parts by weight of distilled and deoxygenated water. After solution it was added to a stainless steel autoclave which was then cooled by circulating ice water. Fifty parts by weight of perfluorooctanoic acid was then added and 400 parts by weight of symmetrical dichlorodifluoroethylene was added. The contents of the autoclave was cooled and then 3600 parts by weight of vinylidene fluoride was added by gas transfer in vacuum. The autoclave was shaken and heated at 80° C. for 18 hours, then vented and opened, the copolymer filtered off, washed thoroughly with water and alcohol and dried. Chlorine analysis of the copolymer indicated a vinylidene fluoride content of about 95 mol percent.

Fifteen parts by weight of this copolymer was added to 85 parts by weight of dimethylacetamide and agitated while heating at 60° C. for approximately 20 minutes. After cooling to room temperature, a portion of this mixture was placed on a chromium plate, drawn down with a doctor knife and then heated at 175° C. for 15 minutes. The plate with film attached was then placed in a water quenching tank held at room temperature after which the film was stripped from the plate. The film was clear and free of pin holes and had a tensile strength of 3100 p.s.i. at room temperature.

*Example 7*

Fifteen parts by weight of vinylidene fluoride polymer was added to 85 parts by weight of diethylformamide. The solvent imparted a solvent melting temperature ($T_m$) of 92° C. with respect to the polymer. The mixture was then heated while being agitated at 60° C. for 15 minutes. Upon cooling down to room temperature the major portion of the vinylidene fluoride polymer remained undissolved. Decantation of a portion of the liquid followed by evaporation of the solvent indicated that only a solids content of about 2% was obtained. This low solids-content solution was impractical for film forming purposes, when cast at room temperature.

*Example 8*

Fifteen parts by weight of vinylidene fluoride homopolymer was added to 85 parts by weight of diethyladipate. The polymer showed a $T_m$ of 138° C. with respect to diethyladipate. The mixture was heated at 80° C. for 15 minutes after which it was allowed to cool to room temperature. The majority of the polymer was undissolved. A portion of the liquid was filtered off from the undissolved polymer and cast on a chrome plate. The plate was heated to 160° C. for 15 minutes until all solvent had evaporated. There was no film deposited on the plate.

*Example 9*

Fifteen parts by weight of vinylidene fluoride polymer was added to a mixture of 40 parts by weight of dimethylacetamide and 45 parts by weight of tetramethylurea. The mixture was heated at 60° C. for ten minutes until solution was obtained. The solution was then allowed to cool to room temperature. A portion of this solution was then cast on a chromium plate and drawn down by a doctor knife.

The film was then heated in a drying chamber at a temperature of 150° C. for 10 minutes and then placed in a second drying chamber and heated at 180° C. for 5 minutes. The plate with film attached was then placed in a water quenching tank held at room temperature after which the film was separated from the plate.

The film was clear, free of pin holes and without any bubbles. The transparent sheet had a tensile strength of 5000 p.s.i. at room temperature.

*Example 10*

Twenty parts by weight of vinylidene fluoride homopolymer was added to a mixture of 45 parts by weight of dimethylacetamide, 20 parts by weight of methylisobutyl ketone and 15 parts by weight of methylethylketone. The mixture was heated in a closed container while being agitated at 75° C. until a clear solution was obtained. The solution was then allowed to cool to room temperature. The viscosity of the solution at 75° C. was 85 centipoises.

The material was sprayed at 75° C. onto a chrome plate. The plate with attached coating was then placed in a drying chamber and heated at 150° C. for 10 minutes and then placed in a second drying chamber and heated at 180° C. for 5 minutes. After this the plate with film attached was placed in a water quenching tank held at room temperature. Following the quenching, the film was stripped from the plate. The film had the appearance of a clear transparent sheet, was free of pin holes and there were no visible bubbles. The transparent sheet had a tensile strength of 5180 p.s.i. at room temperature.

*Example 11*

A steel panel was sand blasted, treated with a zinc dihydrogen phosphate solution and then rinsed and dried. A solution containing 15% of polyvinylidene fluoride in dimethylacetamide was heated to about 95° C. and then sprayed on the panel. Just one application of the polymer was made to the panel. The coated panel was then placed in an oven and heated at a temperature of 150° C. for 10 minutes followed by heating at 180° C. for 5 minutes. The polymer coalesced into a continuous film free of pin holes.

The dried coating had a film thickness of 1 to 2 mils as determined by a General Electric thickness gage measurement of the panel before and after coating. The coating was quite flexible and strong. A reverse impact tester at a loading of 28 pounds showed no rupture of the film. Similarly, in a Mandrell bend test, no rupture of the film occurred using the ⅛" diameter Mandrell.

*Example 12*

Fifteen parts by weight of polyvinylidene fluoride was dispersed in 85 parts by weight of diethyloxalate. This liquid imparts a $T_m$ to the polyvinylidene fluoride of 130° C. The mixture was heated at 65° C. for 1 hour. A two phase solid and liquid system resulted. A portion of the liquid phase was withdrawn from the mixture and placed in an aluminum dish. It was evaporated at 180° C. for 1 hour. Only a very small amount of solid was left indicating a solid content of the liquid phase of less than 5%.

While the above examples have disclosed sequential operation, it will be apparent to those skilled in the art that they are adaptable to continuous processes.

We claim:

Polymeric solutions comprising vinylidene fluoride homopolymer in admixture with at least one solvent selected from the group consisting of dimethylacetamide, dimethyl sulfoxide, tetramethyl urea and diethylacetamide, said homopolymer being present in the solutions within the range of 5 to 30 weight percent.

References Cited by the Examiner
UNITED STATES PATENTS

| | | | |
|---|---|---|---|
| 2,435,537 | 2/48 | Ford et al. | 260—92.1 |
| 2,460,578 | 2/49 | Houtz | 260—32.6 |
| 2,531,406 | 11/50 | D'Alelio | 260—32.6 |

MORRIS LIEBMAN, *Primary Examiner.*

LEON J. BERCOVITZ, LESLIE H. GASTON, ALEXANDER H. BRODMERKEL, *Examiners.*